(12) United States Patent
Kim et al.

(10) Patent No.: US 11,571,948 B2
(45) Date of Patent: *Feb. 7, 2023

(54) HEAT PUMP SYSTEM FOR VEHICLE

(71) Applicants: Hyundai Motor Company, Seoul (KR); Kia Corporation, Seoul (KR)

(72) Inventors: Jeawan Kim, Gwangmyeong-si (KR); Jae Yeon Kim, Hwaseong-si (KR); Yeonho Kim, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 26 days.

This patent is subject to a terminal disclaimer.

(21) Appl. No.: 17/360,787

(22) Filed: Jun. 28, 2021

(65) Prior Publication Data

US 2022/0185067 A1 Jun. 16, 2022

(30) Foreign Application Priority Data

Dec. 10, 2020 (KR) ........................ 10-2020-0172334

(51) Int. Cl.
  *F25D 23/12* (2006.01)
  *B60H 1/00* (2006.01)
(52) U.S. Cl.
  CPC ..... *B60H 1/00921* (2013.01); *B60H 1/00278* (2013.01); *B60H 2001/00307* (2013.01); *B60H 2001/00928* (2013.01)

(58) Field of Classification Search
  CPC ............ B60H 1/00921; B60H 1/00278; B60H 2001/00307; B60H 2001/00928
  USPC ......................................................... 62/259.2
  See application file for complete search history.

(56) References Cited

U.S. PATENT DOCUMENTS

| 10,661,631 | B2 | 5/2020 | Kawano |
| 2010/0281901 | A1 | 11/2010 | Kawase et al. |
| 2022/0088991 | A1* | 3/2022 | Kim ..................... B60H 1/3223 |
| 2022/0088995 | A1* | 3/2022 | Kim ..................... B60H 1/3213 |

FOREIGN PATENT DOCUMENTS

| JP | H 09-286225 A | 11/1997 |
| KR | 10-1558314 B1 | 10/2015 |
| KR | 10-2020-0040432 A | 4/2020 |

* cited by examiner

*Primary Examiner* — Davis D Hwu
(74) *Attorney, Agent, or Firm* — Morgan, Lewis & Bockius LLP

(57) ABSTRACT

A heat pump system for a vehicle may control a temperature of a battery module by use of one chiller in which a refrigerant and a coolant are heat-exchanged; and may increase a flow rate of the refrigerant by applying a gas injection device that selectively operates in a cooling, heating, or dehumidifying mode of a vehicle, maximizing cooling and heating performance.

20 Claims, 8 Drawing Sheets

HEAT PUMP SYSTEM FOR VEHICLE

CROSS-REFERENCE TO RELATED APPLICATION

The present application claims priority to Korean Patent Application No. 10-2020-0172334 filed on Dec. 10, 2020, the entire contents of which is incorporated herein for all purposes by this reference.

BACKGROUND OF THE INVENTION

Field of the Invention

The present invention relates to a heat pump system for a vehicle. More particularly, the present invention relates to a heat pump system for a vehicle which adjusts a temperature of a battery module by use of one chiller that performs heat exchange between a refrigerant and a coolant and improves heating performance by applying a gas injection device.

Description of Related Art

In general, an air conditioner for a vehicle includes an air conditioning system for circulating a coolant to heat or cool interior of the vehicle.

Such an air conditioner maintains a comfortable indoor environment by maintaining an internal temperature of the vehicle at an appropriate level regardless of an external temperature change, so that the interior of the vehicle is warmed or cooled through heat exchange by a condenser and an evaporator during a process in which a refrigerant discharged by driving of a compressor circulates back to the compressor after passing through a condenser, a receiver dryer, an expansion valve, and an evaporator.

That is, the air conditioner system condenses a gaseous coolant of a high temperature and a high pressure compressed by the compressor in a cooling mode in the summer to reduce a temperature and humidity of the interior of the vehicle through evaporation in the evaporator through the receiver dryer and the expansion valve.

Meanwhile, in recent years, as interest in energy efficiency and environmental pollution has been increasing, there has been a demand for the development of environmentally friendly vehicles configured for substantially replacing internal combustion engine vehicles. The environmentally friendly vehicles are usually fuel cell or electric vehicles driven by electricity or a hybrid vehicle driven by an engine and a battery.

Among the environmentally friendly vehicles, the electric vehicle or the hybrid vehicle does not use a separate heater, unlike an air conditioner of a general vehicle, and the air conditioner applied to the environmentally friendly vehicle is referred to as a heat pump system.

On the other hand, in the case of the electric vehicle, chemical reaction energy of oxygen and hydrogen is converted into electrical energy to generate driving force. In the present process, since thermal energy is generated by the chemical reaction in the fuel cell, effectively removing the generated heat is essential in securing performance of the fuel cell.

Furthermore, even in the hybrid vehicle, a motor is driven by use of the electricity supplied from the fuel cell or an electric battery together with an engine that operates by general fuel to generate the driving force, and as a result, the performance of the motor may be secured only by effectively removing the heat generated from the fuel cell or the battery and the motor.

As a result, in the hybrid vehicle or the electric vehicle generally, a battery cooling system needs to be separately formed with a separate sealing circuit together with a cooler and the heat pump system to prevent the heat generation in the motor and electrical components, and the battery including the fuel cell.

Accordingly, the size and weight of a cooling module disposed in the front of the vehicle increase and a layout of connection pipes that supply the refrigerant and the coolant to the heat pump system, the cooler, and the battery cooling system is complicated in an engine compartment.

Furthermore, the battery cooling system which heats or cools the battery according to a status of the vehicle for the battery to show optimal performance is separately provided, and as a result, a plurality of valves for connection with the respective connection pipes are adopted and noise and vibration due to frequent opening and closing operations of the valves are transferred to the interior of the vehicle to degrade ride comfort.

Furthermore, when heating the interior of the vehicle, the heating performance decreases due to a lack of a heat source, the amount of electricity consumption increases due to the use of an electric heater, and the power consumption of the compressor increases.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a heat pump system for a vehicle which may simplify a system by controlling a temperature of a battery module by use of one chiller in which a refrigerant and a coolant are heat-exchanged.

Furthermore, various aspects of the present invention are directed to providing a heat pump system for a vehicle which may maximize cooling and heating performance by applying a gas injection device that selectively operates in a heating or dehumidifying mode of a vehicle to increase a flow rate of a refrigerant.

Various aspects of the present invention are directed to providing a heat pump system for a vehicle, including: an air conditioner circulating a refrigerant through a refrigerant line; a coolant circulation apparatus circulating a coolant through a coolant line; a chiller which is connected to the coolant circulation apparatus through the coolant line, is connected to the refrigerant line through a refrigerant connection line connected to a portion of the refrigerant line, and heat-exchanges a coolant selectively introduced from the coolant circulation apparatus with a refrigerant supplied from the air conditioner to control a temperature of the selectively introduced coolant; and a gas injection device provided in the air conditioner and increasing a flow rate of the refrigerant circulating in the refrigerant line by bypassing some of a refrigerant passing through an internal condenser connected to the refrigerant line to a compressor, wherein a heat-exchanger provided in the air conditioner is connected to the coolant circulation apparatus through the coolant line so that the coolant is supplied from the coolant circulation apparatus, and the heat pump system further includes a first branch line connected to the refrigerant line through a first refrigerant valve connected to the refrigerant line at a rear end portion of the heat-exchanger, based on a flow direction of the refrigerant.

The air conditioner may include: a heating, ventilation, and air conditioning (HVAC) module including an evaporator connected to the refrigerant line, and an opening and closing door that is configured to selectively flow an external air passing through the evaporator into the internal condenser according to cooling, heating, and dehumidifying modes of the vehicle; the heat-exchanger that is connected to the refrigerant line and the coolant line and heat-exchanges a refrigerant supplied through the refrigerant line with a coolant supplied through the coolant line from the coolant circulation apparatus; the compressor connected between the evaporator and the heat-exchanger through the refrigerant line; a sub-condenser provided in the refrigerant line between the heat-exchanger and the evaporator; a first expansion valve provided in the refrigerant line connecting the sub-condenser and the evaporator; a second expansion valve provided in the refrigerant connection line; and an accumulator provided in the refrigerant line between the evaporator and the compressor;

The second expansion valve may selectively expand a refrigerant that has passed through the sub-condenser according to a mode of the vehicle among the cooling, heating, and dehumidifying modes of the vehicle, to introduce the refrigerant into the refrigerant connection line.

A first end portion of the refrigerant connection line may be connected to the refrigerant line between the sub-condenser and the first expansion valve; a second end portion of the refrigerant connection line may be connected to the refrigerant line between the accumulator and the evaporator; a first end portion of the first branch line may be connected to the refrigerant line through the first refrigerant valve between the heat-exchanger and the sub-condenser; and a second end portion of the first branch line may be connected to the accumulator.

The gas injection device may include: a gas-liquid separator provided in the refrigerant line between the internal condenser and the heat-exchanger, and separating and selectively discharging a gaseous refrigerant and a liquid refrigerant among the refrigerant that have passed through the internal condenser; a supply line connecting the gas-liquid separator and the compressor, and selectively supplying the gaseous refrigerant from the gas-liquid separator to the compressor; a control valve provided in the supply line; a third expansion valve provided in the refrigerant line between the internal condenser and the gas-liquid separator; and a fourth expansion valve provided in the refrigerant line between the gas-liquid separator and the heat-exchanger.

The heat pump system may further include: a second branch line having a first end portion connected to a second refrigerant valve provided in the refrigerant line between the internal condenser and the compressor, and a second end portion connected to the refrigerant line between the fourth expansion valve and the heat-exchanger; a third branch line having a first end portion connected to a third refrigerant valve provided in the refrigerant line between the sub-condenser and the first expansion valve, and a second end portion connected to the refrigerant line between the internal condenser and the third expansion valve; and a fourth branch line having a first end portion connected to the refrigerant line between the gas-liquid separator and the fourth expansion valve and a second end portion connected to the refrigerant line between the third refrigerant valve and the first expansion valve, and having a check valve.

When a battery module is cooled in the cooling mode of the vehicle and the gas injection device is operated, the coolant circulation apparatus may supply a coolant to the heat-exchanger and the chiller through the coolant line connected to the heat-exchanger and the chiller; in the air conditioner, the refrigerant connection line may be opened through an operation of the second expansion valve; the refrigerant line connected to the first expansion valve may be closed through an operation of the third refrigerant valve; the refrigerant line connecting the internal condenser and the compressor may be closed through an operation of the second refrigerant valve; the refrigerant may be circulated along the opened refrigerant line and the refrigerant connection line; the first and second expansion valves may expand a refrigerant so that an expanded refrigerant is supplied to the evaporator and the chiller, respectively; the first branch line may be closed; the second, third, and fourth branch lines may be opened; the refrigerant line connecting the heat-exchanger and the sub-condenser may be opened through operation of the first refrigerant valve; the heat-exchanger may condense the refrigerant through heat-exchange with the coolant; the sub-condenser may further condense the refrigerant through heat-exchange with external air; in the gas injection device, the supply line may be opened; the third expansion valve may expand the refrigerant supplied through the third branch line and may supply it to the gas-liquid separator; and the fourth expansion valve may not be operated.

When a battery module is cooled in the cooling mode of the vehicle and the gas injection device is not operated, the coolant circulation apparatus may supply a coolant to the heat-exchanger and the chiller through the coolant line connected to the heat-exchanger and the chiller; in the air conditioner, the refrigerant connection line may be opened through an operation of the second expansion valve; the refrigerant may be circulated along the refrigerant line and the refrigerant connection line; the first and second expansion valves may expand a refrigerant so that an expanded refrigerant is supplied to the evaporator and the chiller, respectively; the first, second, third, and fourth branch lines may be closed; the refrigerant line connecting the heat-exchanger and the sub-condenser may be opened through operation of the first refrigerant valve; the heat-exchanger may condense the refrigerant through heat-exchange with the coolant; and the sub-condenser may further condense the refrigerant through heat-exchange with external air.

When the gas injection device is operated in the heating mode of the vehicle, the supply line may be opened; the third expansion valve may expand a refrigerant supplied from the internal condenser to supply it to the gas-liquid separator; the fourth expansion valve may expand a refrigerant supplied from the gas-liquid separator to supply it to the heat-exchanger; the first branch line may be opened through an operation of the first refrigerant valve; and the second, third, and fourth lines may be closed.

When the gas injection device is not operated in the heating mode of the vehicle, the supply line may be closed; the third expansion valve may pass a refrigerant supplied from the internal condenser; the fourth expansion valve may expand a refrigerant that has passed through the gas-liquid separator to supply it to the heat-exchanger; the first branch line may be opened through operation of the first refrigerant valve; and the second, third, and fourth branch lines may be closed.

When the gas injection device is not operated in the dehumidifying mode of the vehicle, the supply line may be closed; the third expansion valve may pass a refrigerant supplied from the internal condenser; the fourth expansion valve may expand a refrigerant that has passed through the gas-liquid separator to supply it to the heat-exchanger; the first branch line may be opened through operation of the first refrigerant valve; the second and third branch lines may be closed; and the fourth branch line may be opened.

When the gas injection device is operated in the dehumidifying mode of the vehicle, the supply line may be opened; the third expansion valve may expand the refrigerant that has supplied from the internal condenser to supply it to the gas-liquid separator; the fourth expansion valve may expand a refrigerant that has passed through the gas-liquid separator to supply it to the heat-exchanger; the first branch line may be opened through operation of the first refrigerant valve; the second and third branch lines may be closed; and the fourth branch line may be opened.

The control valve, when the gas injection device is operated, may operate so that the supply line may be opened.

The second, third, and fourth expansion valves may be electronic expansion valves that selectively expand a refrigerant while controlling flowing of the refrigerant.

The heat-exchanger may additionally condense or evaporate a refrigerant discharged from the gas-liquid separator through heat-exchange with the coolant, according to a selective operation of the fourth expansion valve.

In the heating mode of the vehicle, the coolant circulation apparatus may supply a coolant to the heat-exchanger through the coolant line connected to the heat-exchanger; in the air conditioner, the refrigerant line connecting the sub-condenser and the evaporator may be closed through an operation of the first expansion valve; the refrigerant connection line may be closed through an operation of the second expansion valve; the fourth expansion valve may expand the refrigerant; the first branch line may be opened through an operation of the first refrigerant valve; the refrigerant line connecting the heat-exchanger and the sub-condenser may be closed through operation of the first refrigerant valve; the heat-exchanger may evaporate the refrigerant through heat-exchange with the coolant; and the gas injection device may be selectively operated.

In the dehumidifying mode of the vehicle,
the coolant circulation apparatus may supply a coolant to the heat-exchanger through the coolant line connected to the heat-exchanger; in the air conditioner, the refrigerant line connecting the sub-condenser and the evaporator may be closed through an operation of the first expansion valve; the refrigerant connection line may be closed through an operation of the second expansion valve; the first branch line may be opened through an operation of the first refrigerant valve;
the refrigerant line connecting the heat-exchanger and the sub-condenser may be closed through operation of the first refrigerant valve;
the heat-exchanger may evaporate the refrigerant through heat-exchange with the coolant; the fourth branch line may be opened through an operation of the check valve; and the gas injection device may be selectively operated.

The gas injection device may include: a plate-shaped heat-exchanger provided in the refrigerant line between the heat-exchanger and the sub-condenser; a supply line that includes a first end portion connected to the refrigerant line between the heat-exchanger and the plate-shaped heat-exchanger and a second end portion connected to the compressor through the plate-shaped heat-exchanger; a third expansion valve provided in the supply line at a front end portion of the plate-shaped heat-exchanger; and a fourth expansion valve provided in the refrigerant line between the plate-shaped heat-exchanger and the sub-condenser.

The heat-exchanger may be a water-cooled heat-exchanger; and the sub-condenser may be an air-cooled heat-exchanger.

The gas injection device may selectively operate in a cooling, heating or dehumidifying mode of the vehicle.

As described above, according to the heat pump system for the vehicle according to the exemplary embodiment of the present invention, simplification of the system may be realized, by use of one chiller in which a refrigerant and a coolant are heat-exchanged to control a temperature of a battery module according to a vehicle mode.

Furthermore, according to the exemplary embodiment of the present invention, by efficiently controlling a temperature of a battery module, it is possible to operate the battery module at optimal performance, and a total mileage of the vehicle may be increased through efficient management of the battery module.

Furthermore, according to the exemplary embodiment of the present invention, it is possible to maximize cooling and heating performance by selectively increasing a flow rate of refrigerant in a cooling, heating, or dehumidifying mode of a vehicle by applying a gas injection device.

Furthermore, according to the exemplary embodiment of the present invention, it is possible to reduce manufacturing cost and weight through simplification of an entire system, and to improve space utilization.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
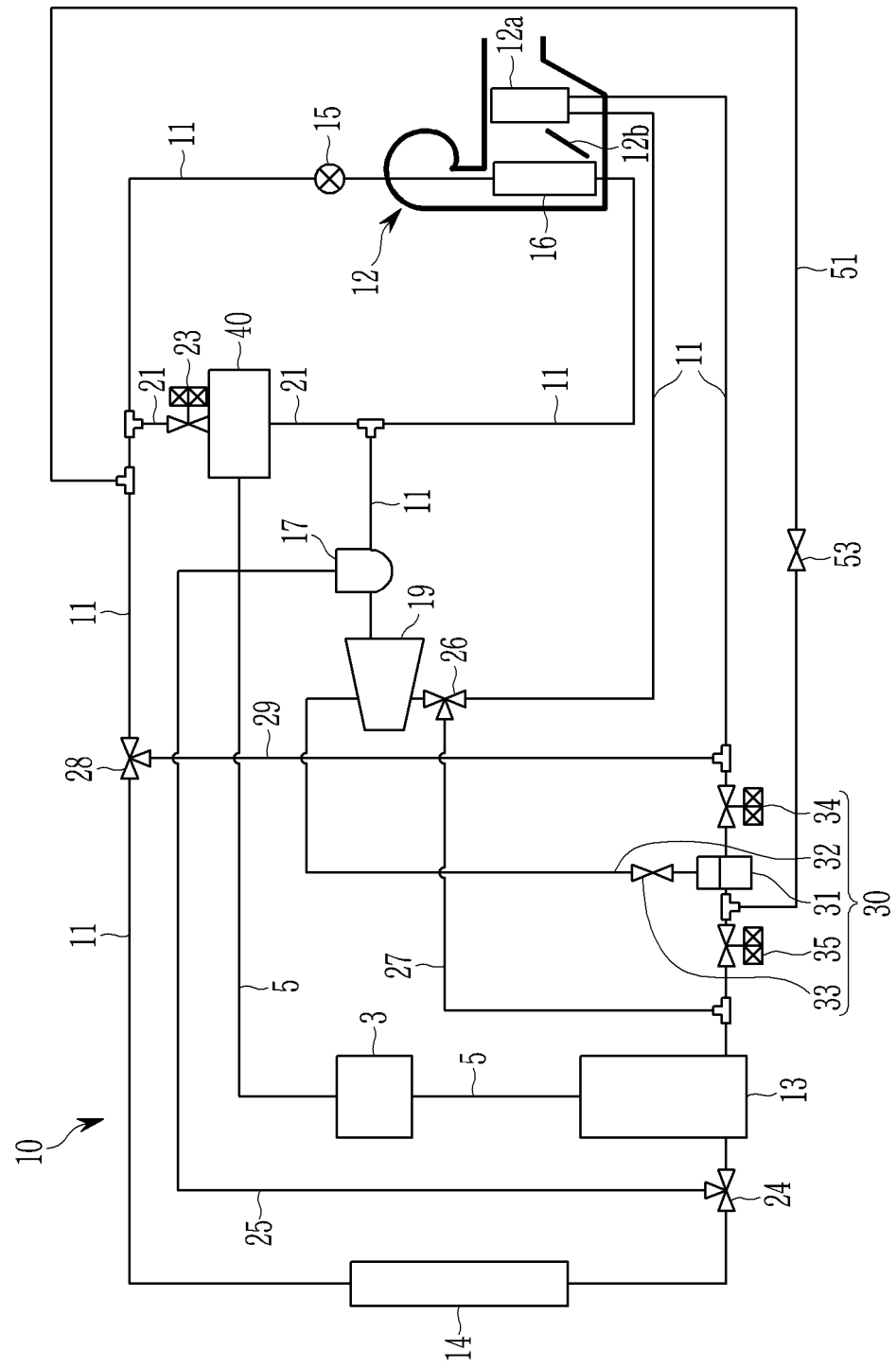
FIG. 1 illustrates a block diagram of a heat pump system for a vehicle according to various exemplary embodiments of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Various exemplary embodiments of the present invention will hereinafter be described in detail with reference to the accompanying drawings.

Exemplary embodiments described in the present specification and configurations shown in the drawings are just the most preferable exemplary embodiments of the present invention, but do not limit the spirit and scope of the present invention. Therefore, it should be understood that there may be various equivalents and modifications capable of replacing them at the time of filing of the present application.

To clarify the present invention, parts that are not connected to the description will be omitted, and the same elements or equivalents are referred to by the same reference numerals throughout the specification.

The size and thickness of each element are arbitrarily shown in the drawings, but the present invention is not necessarily limited thereto, and in the drawings, the thickness of layers, films, panels, regions, etc., are exaggerated for clarity.

Throughout the present specification and the claims which follow, unless explicitly described to the contrary, the word "comprise" or variations such as "comprises" or "comprising" will be understood to imply the inclusion of stated elements but not the exclusion of any other elements.

Furthermore, the terms, " . . . unit", " . . . mechanism", " . . . portion", " . . . member", etc. used herein mean a unit of inclusive components performing at least one or more functions or operations.

FIG. 1 is a block diagram of a heat pump system for a vehicle according to various exemplary embodiments of the present invention.

A heat pump system for a vehicle according to various exemplary embodiments of the present invention may control a temperature of a battery module by use of a chiller 40 in which a refrigerant and a coolant are heat-exchanged, and may improve heating performance by applying a gas injection device 30.

Here, in the heat pump system, a coolant circulation apparatus 3 that supplies a coolant to the electrical components and the battery module in an electric vehicle, and an air conditioner 10 for cooling and heating an interior of the vehicle, may be mutually interconnected.

That is, referring to FIG. 1, the heat pump system may include the coolant circulation apparatus 3, the air conditioner 10, and the chiller 40.

First, the coolant circulation apparatus 3 circulates a coolant through a coolant line 5. The coolant circulation apparatus 3 may be connected to the electrical components and the battery module, which are not shown, through the coolant line 5.

Furthermore, the coolant circulation apparatus 3 may include a radiator, a water pump, and a reservoir tank, which are not shown.

The electrical components may include a power conversion device such as an electric power control unit (EPCU), a motor, an inverter, and an onboard charger (OBC), and an autonomous driving controller.

The electrical components as described above may be connected to the coolant line 5 to be cooled by water cooling.

The coolant circulation apparatus 3 circulates the coolant cooled by the radiator along the coolant line 5 through an operation of a water pump, cooling the electrical components or the battery module to not overheat.

On the other hand, in various exemplary embodiments of the present invention, only one coolant circulation apparatus 3 is provided as an example, but the present invention is not limited thereto, and each coolant circulation apparatus may be applied to supply coolant to the electronic components and the battery module, respectively.

In various exemplary embodiments of the present invention, the air conditioner 10 includes a heating, ventilation, and air conditioning (HVAC) module 12, a heat-exchanger 13, a sub-condenser 14, a first expansion valve 15, an evaporator 16, and an accumulator 17, a compressor 19, a refrigerant connection line 21, a second expansion valve 23, and a first branch line 25, which are connected through a refrigerant line 11.

First, the HVAC module 12 includes the evaporator 16 connected thereto through the refrigerant line 11, and an opening and closing door 12b for controlling the external air passing through the evaporator 16 to selectively flow into an internal condenser 12a according to the cooling, heating, and dehumidifying modes of the vehicle.

That is, the opening and closing door 12b is opened so that the external air that has passed through the evaporator 16 flows into the internal condenser 12a in the heating mode of the vehicle.

In contrast, in the cooling mode of the vehicle, the opening and closing door 12b closes the internal condenser 12a side so that the external air cooled while passing through the evaporator 16 directly flows into the vehicle.

The internal condenser 12a may condense the refrigerant supplied from the compressor 19 by heat-exchanging with the external air.

In various exemplary embodiments of the present invention, the heat-exchanger 13 is connected to the refrigerant line 11 so that the refrigerant passes therethrough. The heat-exchanger 13 may be connected to the coolant circulation apparatus 3 through the coolant line 5 so that the coolant is supplied from the coolant circulation apparatus 3.

That is, the heat-exchanger 13 may condense or evaporate the refrigerant through the heat-exchange with the coolant supplied through the coolant line 5. The heat-exchanger 13 may be a water-cooled heat-exchanger into which a coolant flow.

In the exemplary embodiment of the present invention, the sub-condenser 14 may be provided in the refrigerant line 11 between the heat-exchanger 13 and the evaporator 16. The sub-condenser 14 may be an air-cooled heat exchanger for condensing the refrigerant by use of the external air.

The first expansion valve 15 is provided in the refrigerant line 11 between the sub-condenser 14 and the evaporator 16. The first expansion valve 15 receives the refrigerant passed through the sub-condenser 14 to expand it.

The accumulator 17 is provided in the refrigerant line 11 between the evaporator 16 and the compressor 19.

The accumulator 17 improves efficiency and durability of the compressor 19 by supplying only the gaseous refrigerant to the compressor 19.

The compressor 19 is connected between the evaporator 16 and the heat-exchanger 13 through the refrigerant line 11. The compressor 19 may compress the gaseous refrigerant, and may supply the compressed refrigerant to the internal condenser 12a.

In various exemplary embodiments of the present invention, a first end portion of the refrigerant connection line 21 is connected to the refrigerant line 11 between the sub-condenser 14 and the first expansion valve 15. Furthermore, a second end portion of the refrigerant connection line 21 may be connected to the refrigerant line 11 between the evaporator 16 and the accumulator 17.

Meanwhile, the second expansion valve 23 may be provided in the refrigerant connection line 21.

The second expansion valve 23 may selectively expand the refrigerant that has passed through the sub-condenser 14 according to a mode of the vehicle to flow it into the refrigerant connection line 21 or pass it through the refrigerant connection line 21.

When the battery module is cooled by use of the coolant heat-exchanged with the refrigerant, the second expansion valve 23 expands the refrigerant introduced through the refrigerant connection line 21 to flow it into the chiller 40.

That is, the second expansion valve 23 expands the refrigerant discharged from the sub-condenser 14 to lower the temperature thereof and flows it into the chiller 40, so that a temperature of the coolant passing through the inside of the chiller 40 may be further reduced.

Accordingly, the coolant whose water temperature is lowered while passing through the chiller 40 may flow into and cool the battery module.

In the exemplary embodiment of the present invention, the first branch line 25 is connected to the refrigerant line 11 through a first refrigerant valve 24 at a rear end portion of the heat-exchanger 13, based on the flow direction of the refrigerant.

That is, a first end portion of the first branch line 25 is connected to the refrigerant line 11 between the heat-exchanger 13 and the sub-condenser 14 through the first refrigerant valve 24. Furthermore, a second end portion of the first branch line 25 may be connected to the accumulator 17.

The first branch line 25 may be opened through an operation of the first refrigerant valve 24 in the heating mode or the dehumidifying mode of the vehicle. In the instant case, the first refrigerant valve 24 may close the refrigerant line 11 connected to the sub-condenser 14.

Meanwhile, in various exemplary embodiments of the present invention, the heat pump system may further include a gas injection device 30.

The gas injection device 30 is provided in the air conditioner 10.

The gas injection device 30 may bypass some of the refrigerant that has supplied to the refrigerant line 11 to the compressor 19 to increase the flow rate of the refrigerant circulating in the refrigerant line 11.

The gas injection device 30 configured as described above may be selectively operated in the cooling, heating or dehumidifying mode of the vehicle.

Here, the gas injection device 30 includes a gas-liquid separator 31, a supply line 32, a control valve 33, a third expansion valve 34, and a fourth expansion valve 35.

First, the gas-liquid separator 31 is provided in the refrigerant line 11 between the internal condenser 12a and the heat-exchanger 13.

The gas-liquid separator 31 may separate gaseous refrigerant and liquid refrigerant of the refrigerant completely heat-exchanged while passing through the internal condenser 12a to selectively discharge them.

The supply line 32 connects the gas-liquid separator 31 and the compressor 19. The supply line 32 may selectively supply the gaseous refrigerant from the gas-liquid separator 31 to the compressor 19.

That is, the supply line 32 may connect the gas-liquid separator 31 and the compressor 19 so that the gaseous refrigerant that has passed through the gas-liquid separator 31 may selectively flow into the compressor 19.

In various exemplary embodiments of the present invention, the control valve 33 is provided in the supply line 32. The control valve 33 may selectively open the supply line 32 according to the vehicle mode.

That is, the control valve 33 may be operated so that the supply line 32 may be opened when the gas injection device 30 is operated.

Here, the gas-liquid separator 31 may supply the gaseous refrigerant to the compressor 19 through the supply line 32 opened by the operation of the control valve 33. Furthermore, the gas-liquid separator 31 may supply a liquid refrigerant to the heat-exchanger 13.

The third expansion valve 34 is provided in the refrigerant line 11 between the internal condenser 12a and the gas-liquid separator 31.

Furthermore, the fourth expansion valve 35 may be provided in the refrigerant line 11 between the gas-liquid separator 31 and the heat-exchanger 13.

That is, when the battery module is cooled in the cooling mode of the vehicle and the gas injection device is operated, the third expansion valve 33 may expand the refrigerant introduced into the refrigerant line 11 and supply it to the gas-liquid separator 31. The fourth expansion valve 34 is not operated.

Accordingly, the refrigerant that has passed through the gas-liquid separator 31 may not introduced into the heat-exchanger 13.

Conversely, when the battery module is cooled in the cooling mode of the vehicle and the gas injection device 30 is not operated, the third and fourth expansion valves 34 and 35 may not expand the refrigerant supplied to the internal condenser 12a and flow it through the refrigerant line 11.

Furthermore, when the gas injection device 30 is operated in the heating mode of the vehicle, the third expansion valve 34 may expand the refrigerant supplied from the internal condenser 12a to supply it to the gas-liquid separator 31.

Furthermore, the fourth expansion valve 35 may expand the refrigerant supplied from the gas-liquid separator 31 to flow into the refrigerant line 11.

Conversely, when the gas injection device 30 is not operated in the heating mode of the vehicle, the third expansion valve 34 may pass the refrigerant supplied from the internal condenser 12*a*.

Furthermore, the fourth expansion valve 35 may expand the refrigerant passed through the gas-liquid separator 31 to supply it to the heat-exchanger 13.

Meanwhile, when the gas injection device 30 is operated in the dehumidifying mode of the vehicle, the third expansion valve 34 may expand the refrigerant supplied from the internal condenser 12*a* to supply it to the gas-liquid separator 31.

Furthermore, the fourth expansion valve 35 may expand the refrigerant passed through the gas-liquid separator 31 to supply it to the heat-exchanger 13.

Conversely, when the gas injection device 30 is not operated in the dehumidifying mode of the vehicle, the third expansion valve 34 may pass the refrigerant supplied from the internal condenser 12*a*.

Furthermore, the fourth expansion valve 35 may expand the refrigerant passed through the gas-liquid separator 31 to supply it to the heat-exchanger 13.

Herein, the heat-exchanger 13 may selectively condense or evaporate the refrigerant that has passed through the internal condenser 12*a* according to whether the gas injection device 30 is operated.

The heat-exchanger 13 additionally condenses or evaporates the refrigerant discharged from the gas-liquid separator 31 through heat-exchange with the coolant according to the selective operation of the fourth expansion valve 35.

When the heat-exchanger 13 condenses the refrigerant, the heat-exchanger 13 further condenses the refrigerant condensed in the internal condenser 12*a*, and the sub-condenser further condenses the refrigerant, so that it may increase sub-cooling of the refrigerant, thus a coefficient of performance (COP), which is a coefficient of cooling capacity to required power of a compressor, may be improved.

Meanwhile, the gas injection device 30 may further include a separate connection line that has a first end portion connected to the refrigerant line 11 between the internal condenser 12*a* and the third expansion valve 34, and a second end portion connected to the refrigerant line 11 between the fourth expansion valve 35 and the heat-exchanger 13.

A separate on-off valve may be provided in the separate connection line.

That is, the connection line is opened through operation of the on-off valve, and in the instant case, the refrigerant that has passed through the internal condenser 12*a* may be directly supplied to the heat-exchanger 13 without passing through the gas injection device 30.

Accordingly, when the gas injection device 30 is not operated, the pressure of the refrigerant circulating along the refrigerant line 11 may be reduce.

Meanwhile, the air conditioner 10 may further include second, third, and fourth branch line 27, 29, and 51.

First, a first end portion of the second branch line 27 is connected to a second refrigerant valve 26 provided in the refrigerant line 11 between the internal condenser 12*a* and the compressor 19.

A second end portion of the second branch line 27 is connected to the refrigerant line 11 between the fourth expansion valve 34 and the heat-exchanger 13.

In the exemplary embodiment of the present invention, a first end portion of the third branch line 29 is connected to a third refrigerant valve 28 provided in the refrigerant line 11 between the sub-condenser 14 and the first expansion valve 15.

A second end portion of the third branch line 29 is connected to the refrigerant line 11 between the internal condenser 12*a* and the third expansion valve 34.

A first end portion of the fourth branch line 51 is connected to the refrigerant line 11 between the gas-liquid separator 31 and the fourth expansion valve 35.

A second end portion of the fourth branch line 51 is connected to the refrigerant line 11 between the third refrigerant valve 28 and the first expansion valve 15. Herein, a check valve 53 may be provided in the fourth branch line 51.

That is, the fourth branch line 51 may be selectively opened through an operation of the check valve 53 in the cooling and dehumidifying modes of the vehicle.

In the exemplary embodiment of the present invention, the chiller 40 is connected to the coolant circulation apparatus 3 through the coolant line 5, and the coolant may be selectively circulated therein.

The chiller 40 is connected to the refrigerant line 11 through the refrigerant connection line 21. That is, the chiller 40 may be a water-cooled heat-exchanger into which a coolant flow.

Accordingly, the chiller 40 heat-exchanges the coolant selectively flowing through the coolant line 5 with the refrigerant selectively supplied from the air conditioner 10 to control the temperature of the coolant.

In the exemplary embodiment of the present invention, the first expansion valve 15 may be a mechanical expansion valve, and the second, third, and fourth expansion valves 23, 34, and 35 that selectively expand the refrigerant while controlling the flow of the refrigerant passing through the refrigerant line 11 or the refrigerant connection line 21.

Meanwhile, a gas injection device 130 according to various exemplary embodiments of the present invention will be described with reference to FIG. 2.

Figure 2:
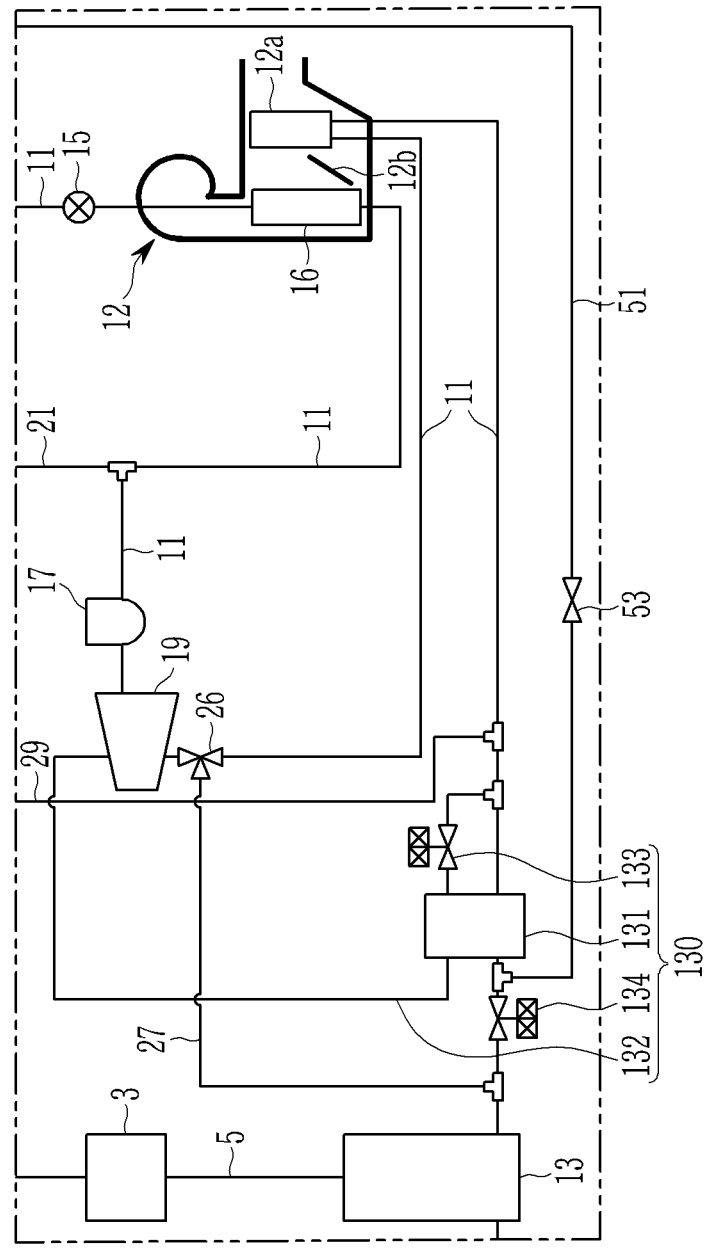
FIG. 2 illustrates a block diagram of a gas injection device applied to a heat pump system for a vehicle according to various exemplary embodiments of the present invention.

FIG. 2 illustrates a block diagram of a gas injection device applied to a heat pump system for a vehicle according to various exemplary embodiments of the present invention.

Referring to FIG. 2, the gas injection device 130 according to various exemplary embodiments of the present invention is provided in the air conditioner 10.

Herein, the gas injection portion 130 may include a plate-shaped heat-exchanger 131, a supply line 132, a third expansion valve 133, and a fourth expansion valve 134.

First, the plate-shaped heat-exchanger 131 may be provided in the refrigerant line 11 between the internal condenser 12*a* and the heat-exchanger 13.

A first end portion of the supply line 132 is connected to the refrigerant line 11 between the internal condenser 12*a* and the plate-shaped heat-exchanger 131.

A second end portion of the supply line 132 may be connected to the compressor 19 through the plate-shaped heat-exchanger 131.

That is, some of the refrigerant that has passed through the internal condenser 12*a* or has introduced through the third branch line 29 may flow into the supply line 132 and the remaining refrigerant thereof may flow into the plate-shaped heat-exchanger 131 through the refrigerant line 11.

The third expansion valve 133 may be provided in the supply line 132 at a front end portion of the plate-shaped heat-exchanger 131.

The third expansion valve 133 may selectively open or close the supply line 132 according to whether the gas injection portion 130 is operated, and at the same time, expand the refrigerant flowing into the supply line 132.

Furthermore, the fourth expansion valve 134 may be provided in the refrigerant line 11 between the plate-shaped heat-exchanger 131 and the heat-exchanger 13.

Herein, when the gas injection device 130 is operated, the third expansion valve 133 may expand the refrigerant introducing into the supply line 132 in the cooling mode, heating mode, or dehumidifying mode of the vehicle to supply it to the plate-shaped heat-exchanger 131.

Accordingly, the plate heat-exchanger 131 may heat-exchange the refrigerant expanded through operation of the third expansion valve 133 and flowing into the supply line 132 with the refrigerant passing through the refrigerant line 11.

Accordingly, the supply line 132 may selectively supply a gaseous refrigerant among the refrigerant heat-exchanged while passing through the plate-shaped heat-exchanger 131 to the compressor 19.

The operation of the gas injection device 130 configured as described above is as follows.

First, some of the refrigerant that has passed through the internal condenser 12a flows into the supply line 132 according to the operation of the third expansion valve 133.

The refrigerant flowing into the supply line 132 is expanded through operation of the third expansion valve 133, and the expanded refrigerant enters a gaseous state while being heat-exchanged with the remaining refrigerant introducing through the refrigerant line 11, inside the plate-shaped heat-exchanger 131.

The gaseous refrigerant is supplied to the compressor 19 through the opened supply line 132.

That is, the gas injection portion 130 flows the gaseous refrigerant heat-exchanged while passing through the plate-shaped heat-exchanger 131 back into the compressor 19 through the supply line 132, increasing the flow rate of the refrigerant circulating in the refrigerant line 11.

On the other hand, the fourth expansion valve 134 may expand the refrigerant passing through the plate-shaped heat-exchanger 131 to flow it into the refrigerant line 11, regardless of whether the gas injection portion 30 is operated in the heating or dehumidifying mode of the vehicle.

Furthermore, when the gas injection device 130 is operated in the cooling mode of the vehicle, the fourth expansion valve 134 may not be operated.

Hereinafter, an operation and action of the heat pump system for the vehicle according to the exemplary embodiment of the present invention configured as described above will be described in detail with reference to FIG. 3 to FIG. 8.

First, an operation for cooling a battery module in the vehicle cooling mode, and the gas injection device 30 is not operated will be described with reference to FIG. 3.

Figure 3:
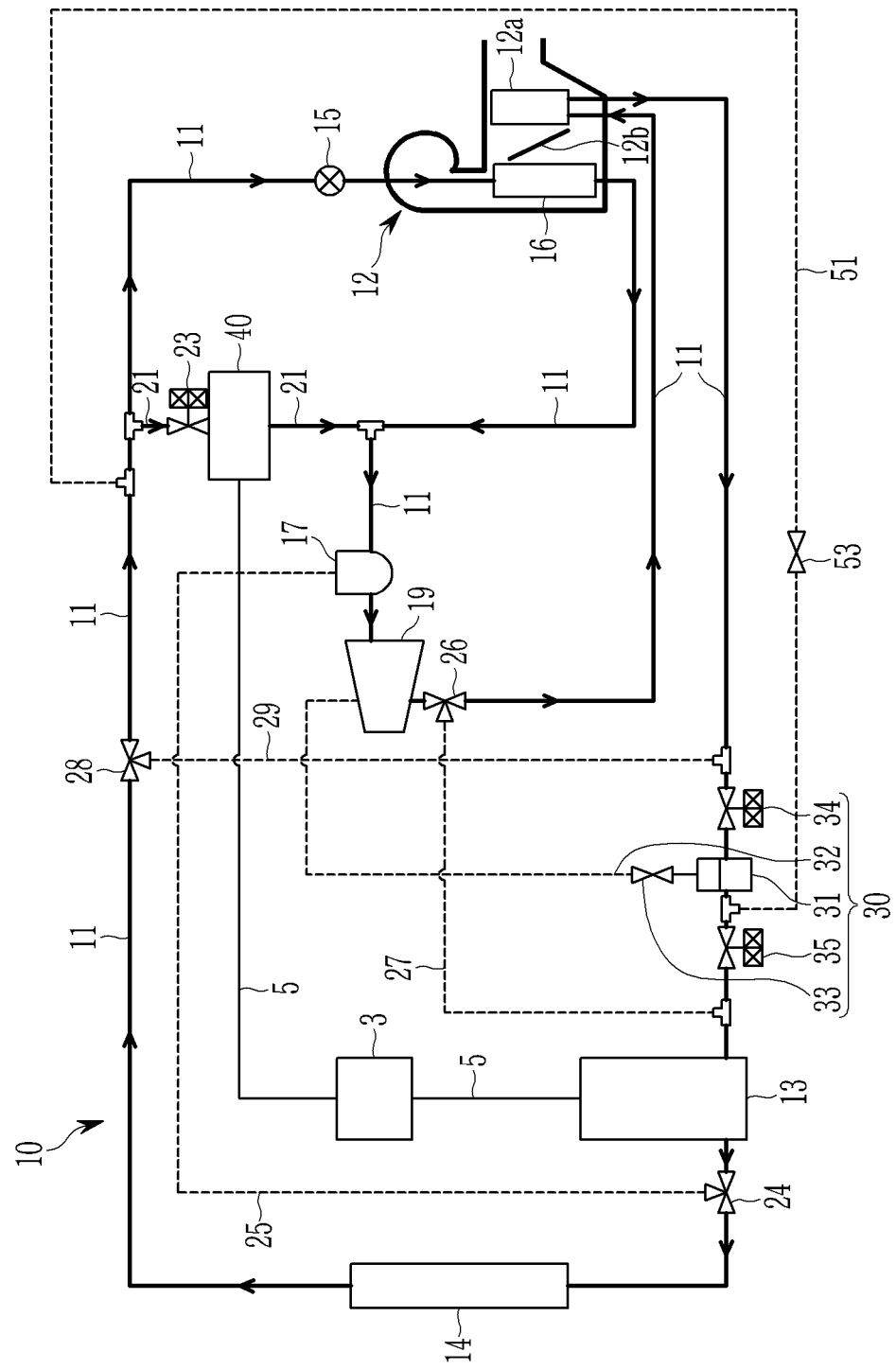
FIG. 3 illustrates an operational state diagram for cooling a battery module by use of a refrigerant in a cooling mode of a vehicle and a gas injection device is not operated, in a heat pump system for a vehicle according to various exemplary embodiments of the present invention.

FIG. 3 illustrates an operational state diagram for cooling a battery module by use of a refrigerant in a cooling mode of a vehicle and a gas injection device is not operated, in a heat pump system for a vehicle according to various exemplary embodiments of the present invention.

Referring to FIG. 3, the coolant circulation apparatus 3 supplies the coolant to the heat-exchanger 13 and the chiller 40 through the coolant line 5 connected to the heat-exchanger 13 and the chiller 40.

In the air conditioner 10, respective constituent elements thereof operate to cool the interior of the vehicle. Accordingly, the refrigerant is circulated along the refrigerant line 11.

Herein, the refrigerant line 11 connecting the sub-condenser 14 and the evaporator 16 is opened through operation of the first expansion valve 15. The refrigerant connection line 21 is opened through operation of the second expansion valve 23.

Furthermore, the first branch line 25 is closed through operation of the first refrigerant valve 24. The second branch line 27 is closed through operation of the second refrigerant valve 26. The third branch line 29 is closed through operation of the third refrigerant valve 28. and the fourth branch line 53 is closed through operation of the check valve 53.

Accordingly, the refrigerant that has passed through the sub-condenser 14 may be circulated along the refrigerant line 11 and the refrigerant connection line 21.

Herein, the first and second expansion valves 15 and 23 may expand the refrigerant so that the expanded refrigerant may be supplied to the evaporator 16 and the chiller 40, respectively.

Furthermore, the sub-condenser 14 may further condense the refrigerant introduced from the heat-exchanger 13 through heat-exchange with the external air.

Meanwhile, the coolant passing through the chiller 40 may cool the battery module connected to the coolant circulation apparatus 3.

That is, the coolant passing through the chiller 40 is cooled through heat-exchange with refrigerant supplied to the first chiller 40. The coolant cooled by the chiller 40 is supplied to the battery module. Accordingly, the battery module may be efficiently cooled by the cooled coolant.

That is, the second expansion valve 23 expands some of the refrigerant that has passed through the sub-condenser 14 so that the expanded refrigerant is supplied to the chiller 40.

Therefore, some of the refrigerant discharged from the sub-condenser 14 is expanded through operation of the second expansion valve 23 to enter a low-temperature and low-pressure state, and introduces into the chiller 40 provided in the refrigerant connection line 21.

Accordingly, the refrigerant introducing into the chiller 40 undergoes heat transfer with the coolant, passes through the accumulator 17 through the refrigerant line 11 connected to the refrigerant connection line 21, and then is introduced into the compressor 19.

Meanwhile, the remaining refrigerant discharged from the sub-condenser 14 introduces through the refrigerant line 11 to cool the interior of the vehicle, and sequentially passes through the first expansion valve 15, the evaporator 16, the accumulator 17, the compressor 19, the internal condenser 12a, and the heat-exchanger 13.

Herein, the external air flowing into the HVAC module 12 is cooled while passing through the evaporator 16 by the low-temperature refrigerant introducing into the evaporator 16.

In the instant case, the opening and closing door 12b closes parts passing through the internal condenser 12a so that cooled outside air does not pass through the internal condenser 12a. Accordingly, the cooled external air directly introduces into the interior of the vehicle, cooling the interior of the vehicle.

Meanwhile, the refrigerant with a condensation amount which is increased while sequentially passing through the heat-exchanger 13 and the sub-condenser 14 is expanded and supplied to the evaporator 16, so that the refrigerant may be evaporated at a lower temperature.

That is, in various exemplary embodiments of the present invention, the heat-exchanger 13 condenses the refrigerant through heat-exchanging with the coolant and the sub-condenser 14 additionally condenses the refrigerant through heat-exchanging with the external air, advantageously performing sub-cooling of the refrigerant.

Furthermore, as the refrigerant in which the sub-cooling is performed is evaporated at a lower temperature in the evaporator 16, the temperature of the external air passing through the evaporator 16 may be further lowered, improving cooling performance and efficiency.

Meanwhile, in the gas injection device 30, the supply line 32 is closed through operation of the control valve 33. Herein, the refrigerant discharged from the internal condenser 12a may be supplied to the heat-exchanger 13 without expansion in the third and fourth expansion valves 34 and 35.

That is, the third and fourth expansion valves 34 and 35 may introduce the refrigerant supplied from the internal condenser 12a into the refrigerant line 11 without expanding.

While repeating the above-described process, the refrigerant may cool the internal in the cooling mode of the vehicle, and at the same time, it may cool the coolant through heat-exchange while passing through the chiller 40.

The low-temperature coolant cooled by the chiller 40 flows into the battery module. Accordingly, the battery module may be efficiently cooled by the supplied low-temperature coolant.

An operation for cooling a battery module in the vehicle cooling mode, and the gas injection device 30 is operated will be described with reference to FIG. 4.

Figure 4:
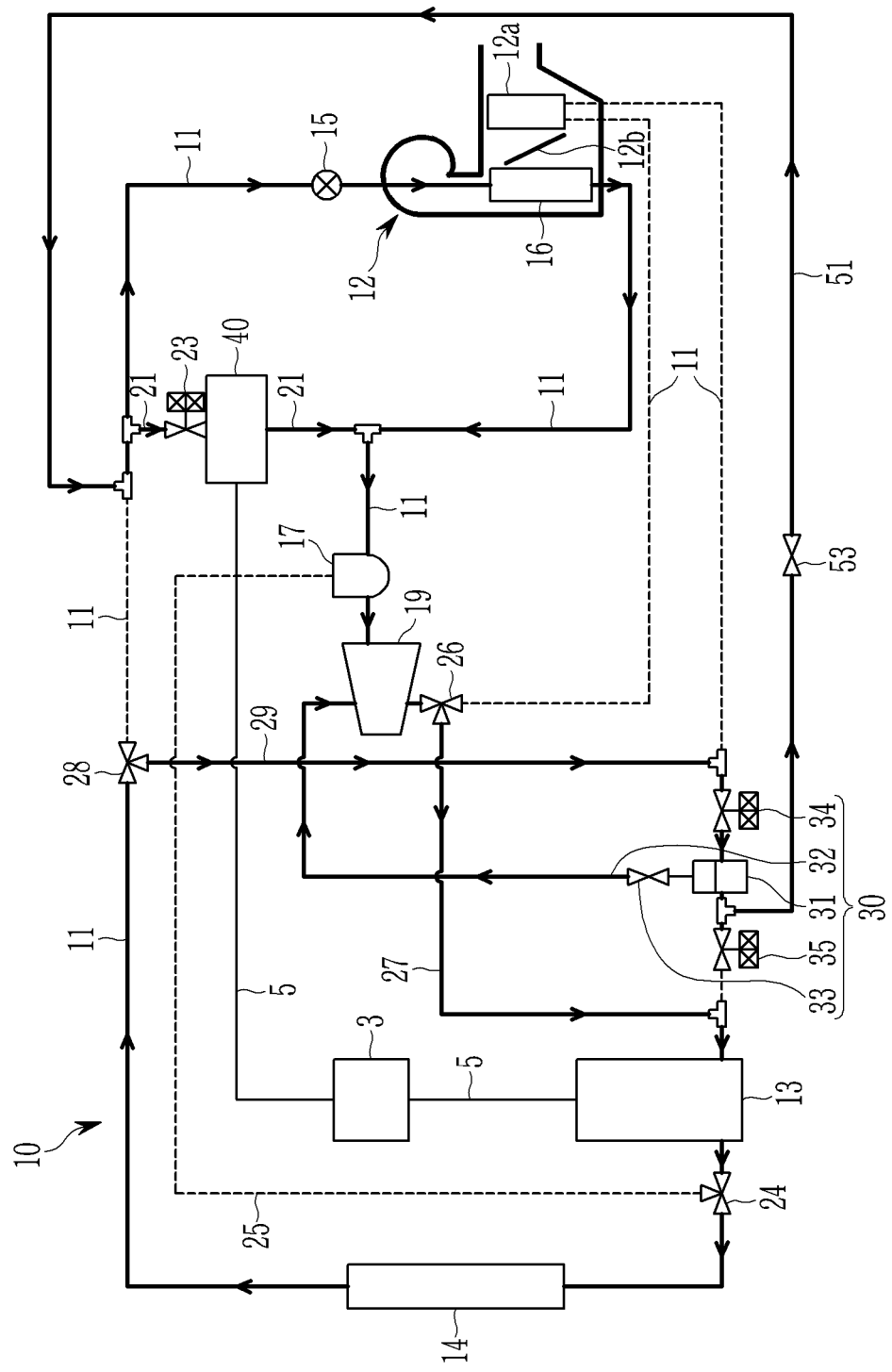
FIG. 4 illustrates an operational state diagram for cooling a battery module by use of a refrigerant in a cooling mode of a vehicle and a gas injection device is operated, in a heat pump system for a vehicle according to various exemplary embodiments of the present invention.

FIG. 4 illustrates an operational state diagram for cooling a battery module by use of a refrigerant in a cooling mode of a vehicle and a gas injection device is operated, in a heat pump system for a vehicle according to various exemplary embodiments of the present invention.

Referring to FIG. 4, the coolant circulation apparatus 3 supplies the coolant to the heat-exchanger 13 and the chiller 40 through the coolant line 5 connected to the heat-exchanger 13 and the chiller 40, respectively.

In the air conditioner 10, respective constituent elements thereof operate to heat the interior of the vehicle. Accordingly, the refrigerant is circulated along the refrigerant line 11.

Herein, the refrigerant line 11 connecting the sub-condenser 14 and the third refrigerant valve 28 is opened. The refrigerant connection line 21 is opened through operation of the second expansion valve 23.

Based on the third refrigerant valve 29, the refrigerant line 11 connected to the first expansion valve 15 is closed through operation of the third refrigerant valve 29.

Furthermore, the refrigerant line 11 connecting the internal condenser 12a and the compressor 19 is closed through operation of the second refrigerant valve 26. At the same time, the refrigerant line 11 connecting the heat-exchanger 13 and the sub-condenser 14 is opened through operation of the first refrigerant valve 24.

Herein, the first branch line 25 is closed through operation of the first refrigerant valve 24, and the second branch line 27 is opened through operation of the second refrigerant valve 26.

Furthermore, the third branch line 29 is opened through operation of the third refrigerant valve 28, and the fourth branch line 53 is closed through operation of the check valve 53.

Accordingly, the refrigerant may be circulated along the opened refrigerant line 11, the opened refrigerant connection line 21, and the opened second, third, and fourth branch lines 27, 29, and 51.

That is, the refrigerant discharged from the compressor 19 is introduced into the heat-exchanger 13 along the opened second branch line 27. The heat-exchanger 13 may condense the refrigerant introduced into the second branch line 27 opened from the compressor 19 through heat-exchanging with the coolant.

Accordingly, the sub-condenser 14 may further condense the refrigerant introduced from the heat-exchanger 13 through heat-exchanging with the external air.

The refrigerant that has passing through the sub-condenser 14 may be supplied to the gas injection device 30 along the opened the refrigerant line 11 and the third branch line 29.

Meanwhile, in the gas injection device 30, the supply line 32 is opened through operation of the control valve 33.

In the present state, the third expansion valve 34 expands the refrigerant supplied through the third branch line 29 and supplies it to the gas-liquid separator 31, and the fourth expansion valve 35 is not operated.

Among the refrigerant supplied to the gas-liquid separator 31, the gaseous refrigerant is supplied to the compressor 19 through the opened supply line 32.

That is, the gas injection device 30 flows the gaseous refrigerant heat-exchanged while passing through the gas-liquid separator 31 back into the compressor 19 through the supply line 32, increasing the flow rate of the refrigerant circulating in the refrigerant line 11.

Furthermore, the liquid refrigerant discharged from the gas-liquid separator 31 through the refrigerant line 11 is introduced into the refrigerant line 11 between the third refrigerant valve 28 and the refrigerant connection line 21 along the opened fourth branch line 51.

Accordingly, some of the refrigerant introduced into the fourth branch line 51 is introduced into the refrigerant connection line 21 opened through operation of the second expansion valve 23. A remaining refrigerant passed through the first expansion valve 15 and is supplied to the evaporator 16.

Herein, the first and second expansion valves 15 and 23 may expand the refrigerant so that the expanded refrigerant is supplied into the evaporator 16 and the chiller 40, respectively.

Meanwhile, the coolant passing through the chiller 40 may cool the battery module connected to the coolant circulation apparatus 3.

That is, the coolant passing through the chiller 40 is cooled through heat-exchange with the expanded refrigerant supplied to the chiller 40. The coolant cooled in the chiller 40 is introduced into the battery module. Accordingly, the battery module may be efficiently cooled by the cooled coolant.

That is, the second expansion valve 23 expands some of the refrigerant introduced into the refrigerant line 11 along the fourth branch line 51 so that the expanded refrigerant is supplied to the chiller 40.

Therefore, some of the refrigerant introduced into the refrigerant connection line 21 is expanded through operation of the second expansion valve 23 to enter a low-temperature and low-pressure state, and introduces into the chiller 40 provided in the refrigerant connection line 21.

Accordingly, the refrigerant introducing into the chiller 40 undergoes heat transfer with the coolant, passes through the accumulator 17 through the refrigerant line 11 connected to the refrigerant connection line 21, and then is introduced into the compressor 19.

Meanwhile, the remaining refrigerant introduced from the fourth branch line to the refrigerant line 11 introduces through the refrigerant line 11 to cool the interior of the vehicle, and sequentially passes through the first expansion valve 15, the evaporator 16, the accumulator 17, the compressor 19, the internal condenser 12a, and the heat-exchanger 13.

Herein, the external air flowing into the HVAC module 12 is cooled while passing through the evaporator 16 by the low-temperature refrigerant introducing into the evaporator 16.

In the instant case, the opening and closing door 12b closes parts passing through the internal condenser 12a so that cooled outside air does not pass through the internal condenser 12a. Accordingly, the cooled external air directly introduces into the interior of the vehicle, cooling the interior of the vehicle.

Meanwhile, the refrigerant with a condensation amount which is increased while sequentially passing through the heat-exchanger 13, the sub-condenser 14, and the gas-liquid separator 31 is expanded and supplied to the evaporator 16, so that the refrigerant may be evaporated at a lower temperature.

That is, in various exemplary embodiments of the present invention, the heat-exchanger 13 condenses the refrigerant through heat-exchanging with the coolant and the sub-condenser 14 additionally condenses the refrigerant through heat-exchanging with the external air, advantageously performing sub-cooling of the refrigerant.

Furthermore, as the refrigerant in which the sub-cooling is performed is evaporated at a lower temperature in the evaporator 16, the temperature of the external air passing through the evaporator 16 may be further lowered, improving cooling performance and efficiency.

Furthermore, the gas injection device 30 may maximize the cooling efficiency performance by increasing the flow rate of the refrigerant circulating in the refrigerant line 11.

While repeating the above-described process, the refrigerant may cool the internal in the cooling mode of the vehicle, and at the same time, it may cool the coolant through heat-exchange while passing through the chiller 40.

The low-temperature coolant cooled in the chiller 40 is introduced into the battery module. Accordingly, the battery module may be efficiently cooled by the supplied low-temperature coolant.

In various exemplary embodiments of the present invention, an operation, when the gas injection portion 30 is not operated in the heating mode of the vehicle, will be described with reference to FIG. 5.

Figure 5:
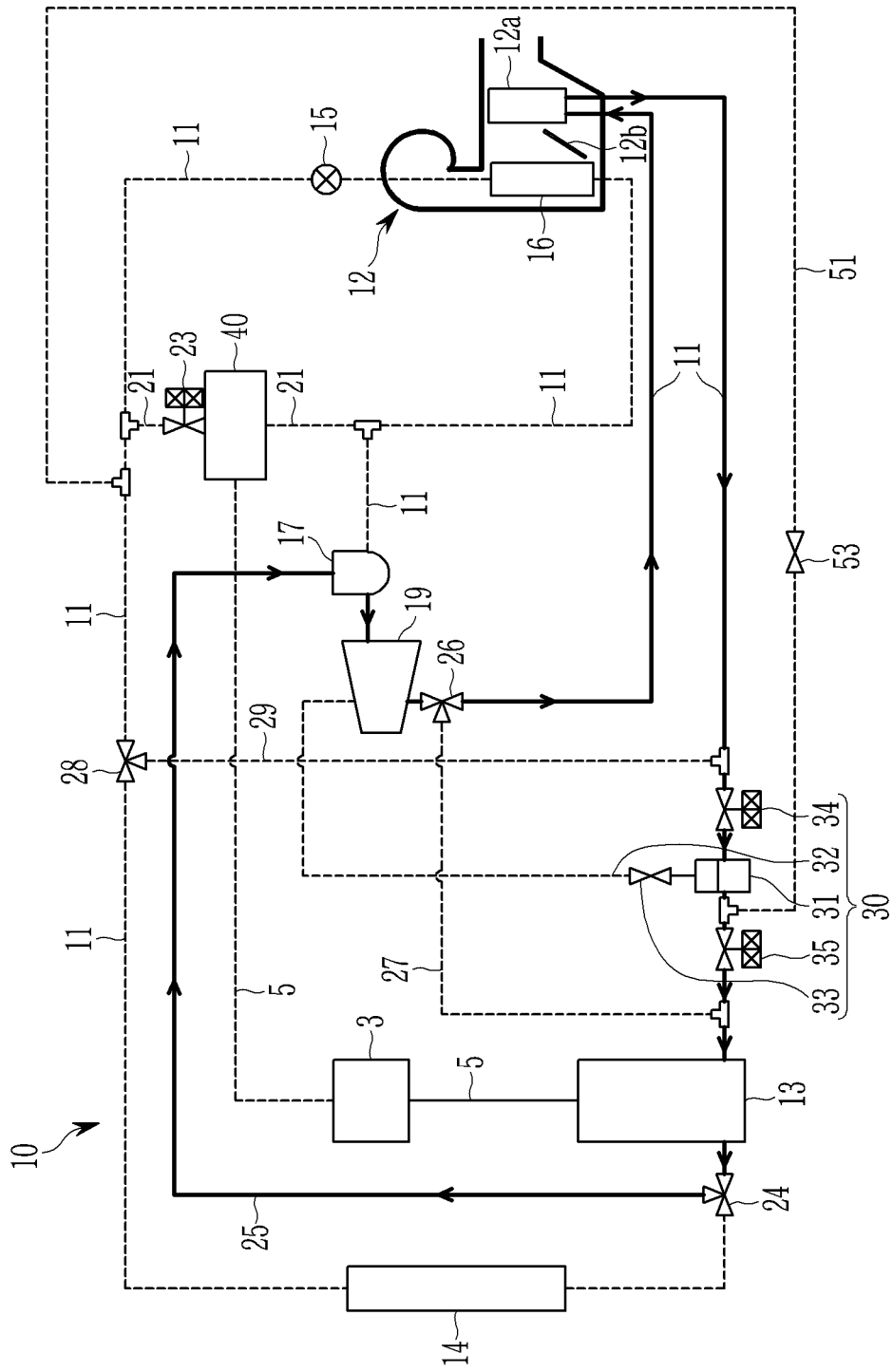
FIG. 5 illustrates an operational state diagram of a heating mode of a vehicle when a gas injection device is not operated in a heat pump system for a vehicle according to various exemplary embodiments of the present invention.

FIG. 5 illustrates an operational state diagram of a heating mode of a vehicle when a gas injection device is not operated in a heat pump system for a vehicle according to various exemplary embodiments of the present invention.

Referring to FIG. 5, the coolant circulation apparatus 3 supplies the coolant to the heat-exchanger 13 through the coolant line 5 connected to the heat-exchanger 13. In the instant case, the coolant line 5 connected to the chiller 40 is closed.

In the air conditioner 10, respective constituent elements thereof operate to heat the interior of the vehicle. Accordingly, the refrigerant is circulated along the refrigerant line 11.

Herein, the refrigerant line 11 connecting the sub-condenser 14 and the evaporator 16 is closed through operation of the first expansion valve 15.

The refrigerant connection line 21 is closed through operation of the second expansion valve 23.

At the same time, the first branch line 25 is opened through operation of the first refrigerant valve 24, and the second branch line 27 is closed through operation of the second refrigerant valve 26.

The third branch line 29 is closed through operation of the third refrigerant valve 28, and the fourth branch line 51 is closed through operation of the check valve 53.

Furthermore, the refrigerant line 11 connecting the heat-exchanger 13 and the sub-condenser 14 may be closed through operation of the first refrigerant valve 24.

Herein, when the gas injection device 30 is not operated, the supply line 32 is closed through operation of the control valve 33. Furthermore, the third expansion valve 34 passes through the refrigerant supplied from the internal condenser 12a.

The fourth expansion valve 35 may expand the refrigerant passed through the gas-liquid separator 31 to supply it to the heat-exchanger 13.

Accordingly, the heat-exchanger 13 may evaporate the expanded refrigerant through heat-exchanging with the coolant.

The refrigerant evaporated in the heat-exchanger 13 is supplied to the accumulator 17 along the first branch line 25.

The refrigerant supplied to the accumulator 17 is separated into gas and liquid. The gaseous refrigerant of the refrigerant separated into gas and liquid is supplied to the compressor 19.

The refrigerant compressed at a high temperature and high pressure in the compressor 19 flows into the internal condenser 12a.

Herein, the refrigerant supplied to the internal condenser 12a may increase the temperature of the external air introducing into the HVAC module 12.

The opening and closing door 12b is opened so that the external air that introduces into the HVAC module 12 and then passes through the evaporator 16 passes through the internal condenser 12a.

As a result, the external air introducing from the outside thereof flows into the room temperature state in which it is not cooled when passing through the evaporator 16 to which no refrigerant is supplied. The introduced external air is converted to a high temperature state while passing through the internal condenser 12a to introduce into the interior of the vehicle, so that the interior of the vehicle may be heated.

In various exemplary embodiments of the present invention, an operation, when the gas injection portion 30 is operated in the heating mode of the vehicle, will be described with reference to FIG. 6.

Figure 6:
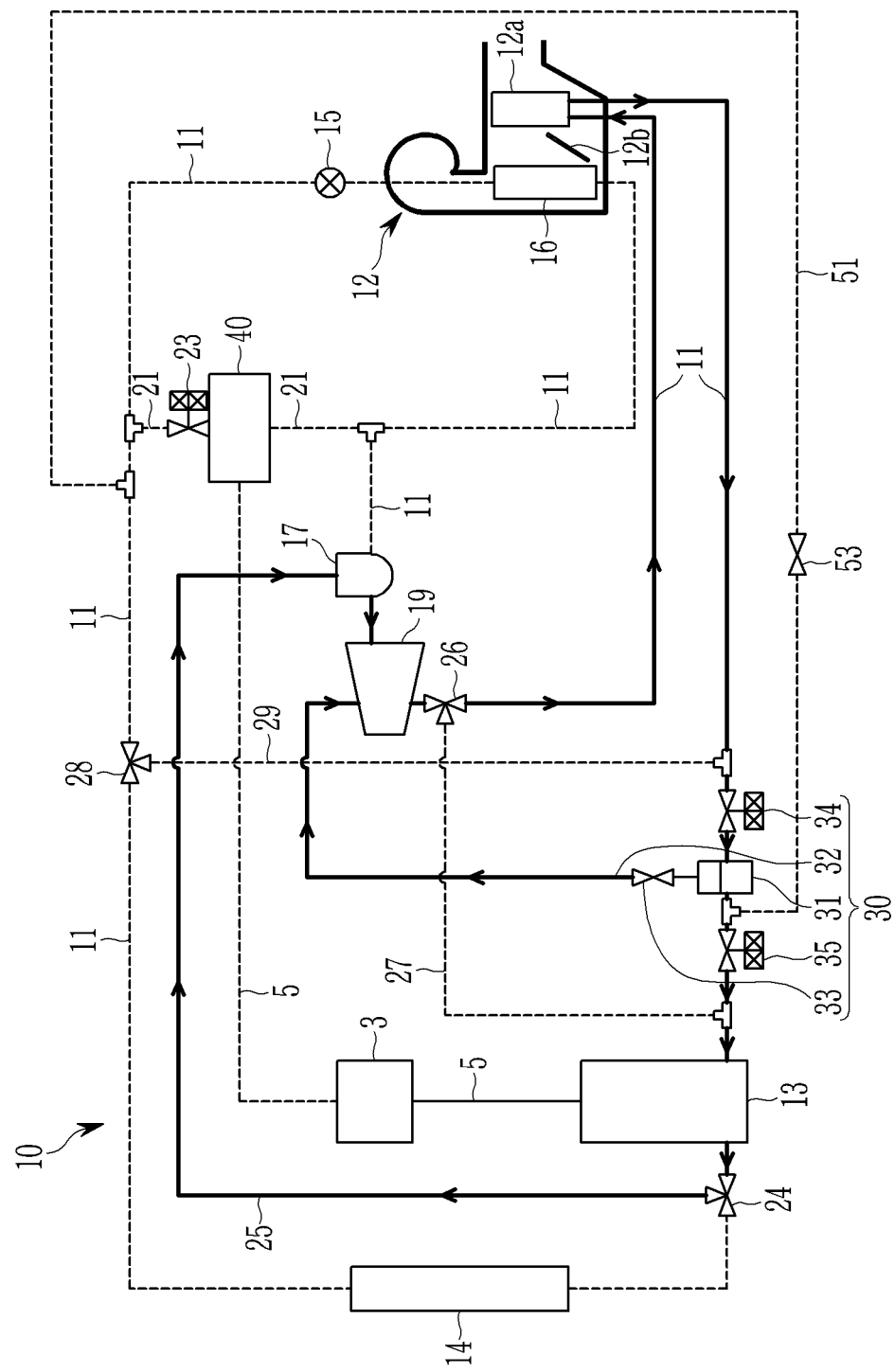
FIG. 6 illustrates an operational state diagram of a heating mode of a vehicle when a gas injection device is operated in a heat pump system for a vehicle according to various exemplary embodiments of the present invention.

FIG. 6 illustrates an operational state diagram of a heating mode of a vehicle when a gas injection device is operated in a heat pump system for a vehicle according to various exemplary embodiments of the present invention.

Referring to FIG. 6, the coolant circulation apparatus 3 supplies the coolant to the heat-exchanger 13 through the coolant line 5 connected to the heat-exchanger 13. In the instant case, the coolant line 5 connected to the chiller 40 is closed.

In the air conditioner 10, respective constituent elements thereof operate to heat the interior of the vehicle. Accordingly, the refrigerant is circulated along the refrigerant line 11.

Herein, the refrigerant line 11 connecting the sub-condenser 14 and the evaporator 16 is closed through operation of the first expansion valve 15.

The refrigerant connection line 21 is closed through operation of the second expansion valve 23.

At the same time, the first branch line 25 is opened through operation of the first refrigerant valve 24, and the second branch line 27 is closed through operation of the second refrigerant valve 26.

The third branch line 29 is closed through operation of the third refrigerant valve 28, and the fourth branch line 51 is closed through operation of the check valve 53.

Furthermore, the refrigerant line 11 connecting the heat-exchanger 13 and the sub-condenser 14 may be closed through operation of the first refrigerant valve 24.

Herein, when the gas injection device 30 is operated, the supply line 32 is opened through operation of the control valve 33.

In the present state, the third expansion valve 34 expands the refrigerant supplied from the internal condenser 12a to supply it to the gas-liquid separator 31.

Among the refrigerant supplied to the gas-liquid separator 31, the gaseous refrigerant is supplied to the compressor 19 through the opened supply line 32.

That is, the gas injection device 30 flows the gaseous refrigerant heat-exchanged while passing through the gas-liquid separator 31 back into the compressor 19 through the supply line 32, increasing the flow rate of the refrigerant circulating in the refrigerant line 11.

Furthermore, the liquid refrigerant discharged from the gas-liquid separator 31 through the refrigerant line 11 flows into the heat-exchanger 13 along the refrigerant line 11 opened through operation of the fourth expansion valve 35.

In the instant case, the fourth expansion valve 35 may expand the refrigerant supplied from the gas-liquid separator 31.

That is, the gas-liquid separator 31 of the gas injection device 30 may bypass the gaseous refrigerant to the compressor 19 through the supply line 32, and may supply the liquid refrigerant to the fourth expansion valve 35.

Accordingly, the refrigerant may be expanded while passing through the fourth expansion valve 35, and may be evaporated through heat-exchange with the external air in the heat-exchanger 13.

The refrigerant expanded in the heat-exchanger 13 is supplied to the accumulator 17 along the first branch line 25.

The refrigerant supplied to the accumulator 17 is separated into gas and liquid. The gaseous refrigerant of the refrigerant separated into gas and liquid is supplied to the compressor 19.

The refrigerant compressed at a high temperature and high pressure in the compressor 19 flows into the internal condenser 12a.

Herein, the refrigerant supplied to the internal condenser 12a may increase the temperature of the external air introducing into the HVAC module 12.

The opening and closing door 12b is opened so that the external air that introduces into the HVAC module 12 and then passes through the evaporator 16 passes through the internal condenser 12a.

As a result, the external air introducing from the outside thereof flows into the room temperature state in which it is not cooled when passing through the evaporator 16 to which no refrigerant is supplied. The introduced external air is converted to a high temperature state while passing through the internal condenser 12a to introduce into the interior of the vehicle, so that the interior of the vehicle may be heated.

Accordingly, the present invention may improve heating efficiency and performance while minimizing a use amount of a separate electric heater.

Furthermore, the gas injection device 30 may maximize the heating performance by increasing the flow rate of the refrigerant circulating in the refrigerant line 11.

In various exemplary embodiments of the present invention, an operation, when the gas injection portion 30 is not operated in the dehumidifying mode of the vehicle, will be described with reference to FIG. 7.

Figure 7:
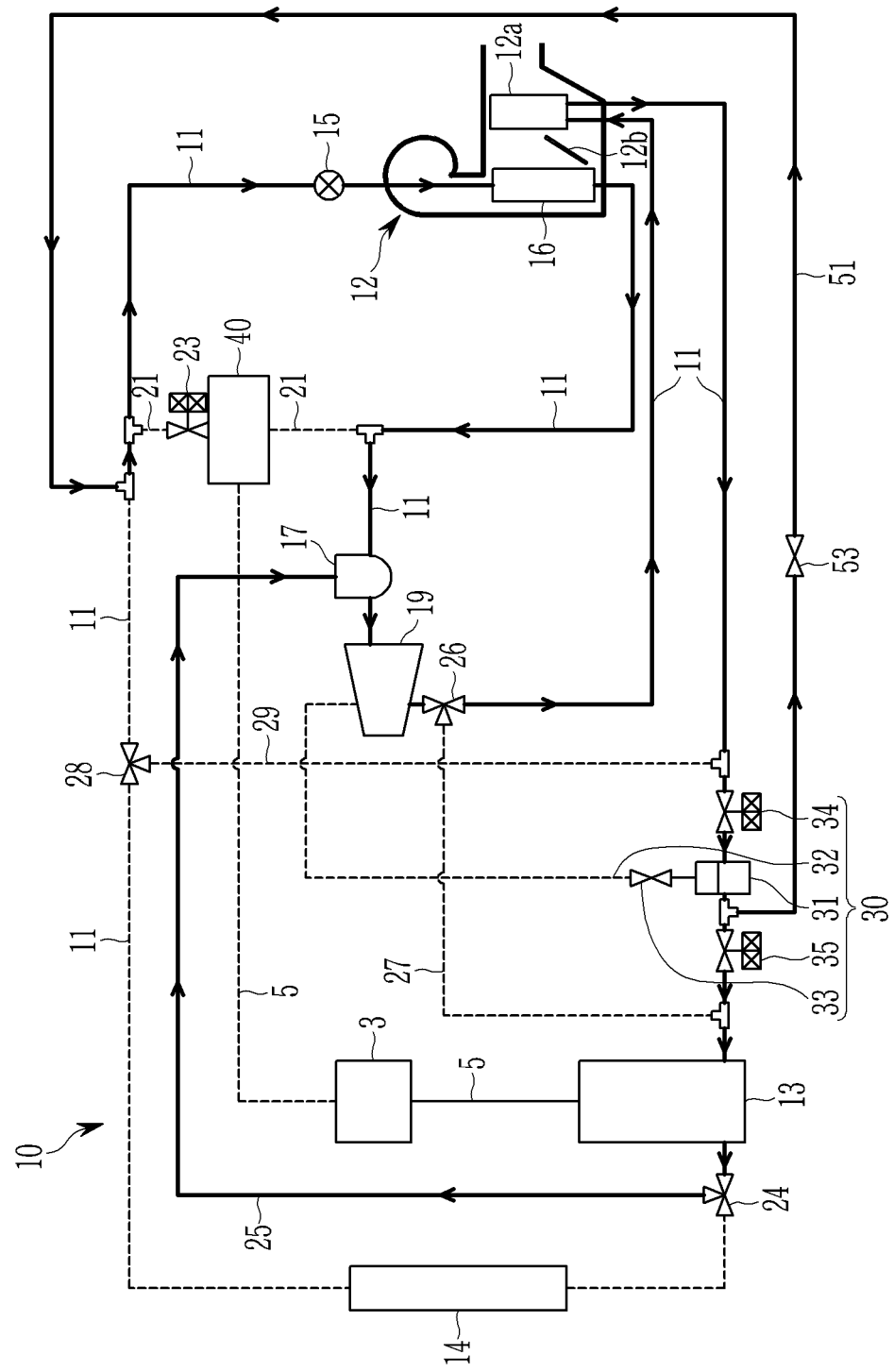
FIG. 7 illustrates an operational state diagram of a dehumidifying mode of a vehicle when the gas injection device is not operated in a heat pump system for a vehicle according to various exemplary embodiments of the present invention.

FIG. 7 illustrates an operational state diagram of a dehumidifying mode of a vehicle when the gas injection device is not operated in a heat pump system for a vehicle according to various exemplary embodiments of the present invention.

Referring to FIG. 7, the heat pump system may perform the dehumidifying mode while heating the interior of the vehicle.

First, the coolant circulation apparatus 3 supplies the coolant to the heat-exchanger 13 through the coolant line 5 connected to the heat-exchanger 13. In the instant case, the coolant line 5 connected to the chiller 40 is closed.

In the air conditioner 10, respective constituent elements thereof operate to heat and dehumidify the interior of the vehicle. Accordingly, the refrigerant is circulated along the refrigerant line 11.

Herein, the refrigerant line 11 connecting the sub-condenser 14 and the evaporator 16 is closed through operation of the first expansion valve 15.

The refrigerant connection line 21 is closed through operation of the second expansion valve 23.

At the same time, the first branch line 25 is opened through operation of the first refrigerant valve 24.

The second branch line 27 is closed through operation of the second refrigerant valve 26, and the third branch line 29 is closed through operation of the third refrigerant valve 28.

The fourth branch line 51 is opened through operation of the check valve 53.

Furthermore, the refrigerant line 11 connecting the heat-exchanger 13 and the sub-condenser 14 may be closed through operation of the first refrigerant valve 24.

Herein, when the gas injection device 30 is not operated, the supply line 32 is closed through operation of the control valve 33.

Furthermore, the third expansion valve 34 passes the refrigerant supplied from the internal condenser 12a.

The fourth expansion valve 35 may expand the refrigerant passed through the gas-liquid separator 31 to supply it to the heat-exchanger 13.

Accordingly, the heat-exchanger 13 may evaporate the expanded refrigerant through heat-exchanging with the coolant.

Meanwhile, the fourth branch line 51 supplies some of the refrigerant that have passed through the gas-liquid separator 31 to the first expansion valve 15.

Accordingly, some of the refrigerant introduced into the fourth branch line 51 is expanded while passing through the first expansion valve 15. The expanded refrigerant is introduced into the evaporator 16.

The refrigerant evaporated in the heat-exchanger 13 is supplied to the accumulator 17 along the first branch line 25.

The refrigerant supplied to the accumulator 17 is separated into gas and liquid. The gaseous refrigerant of the refrigerant separated into gas and liquid is supplied to the compressor 19.

The refrigerant compressed at a high temperature and high pressure in the compressor 19 flows into the internal condenser 12a.

Herein, the refrigerant supplied to the internal condenser 12a may increase the temperature of the external air introducing into the HVAC module 12.

The opening and closing door 12b is opened so that the external air that introduces into the HVAC module 12 and then passes through the evaporator 16 passes through the internal condenser 12a.

Meanwhile, the external air introducing into the HVAC module 12 is dehumidified while passing through the evaporator 16 by the low-temperature refrigerant introducing into the evaporator 16. Accordingly, while passing through the internal condenser 12a, it is converted into a high temperature state to introduce into the interior of the vehicle, heating and dehumidifying the interior of the vehicle.

That is, when the gas injection device 30 is not operated, the third expansion valve 34 passes through the refrigerant supplied from the internal condenser 12a. The fourth expansion valve 35 expands the refrigerant passing through the gas-liquid separator 31 to supply it to the heat-exchanger 13. Herein, the heat-exchanger 13 may evaporate the refrigerant through heat-exchange with the coolant.

Some of the refrigerant that have passed through the gas-liquid separator 31 is supplied to the first expansion valve 15 and the evaporator 16 through the opened fourth branch line 51.

By such an operation, the external air introducing into the HVAC module 12 is dehumidified while passing through the evaporator 16 by the low-temperature refrigerant introducing into the evaporator 16. Accordingly, while passing through the internal condenser 12a, it is converted into a high temperature state to introduce into the interior of the vehicle, smoothly heating and dehumidifying the interior of the vehicle.

In various exemplary embodiments of the present invention, an operation, when the gas injection portion 30 is operated in the dehumidifying mode of the vehicle, will be described with reference to FIG. 8.

Figure 8:
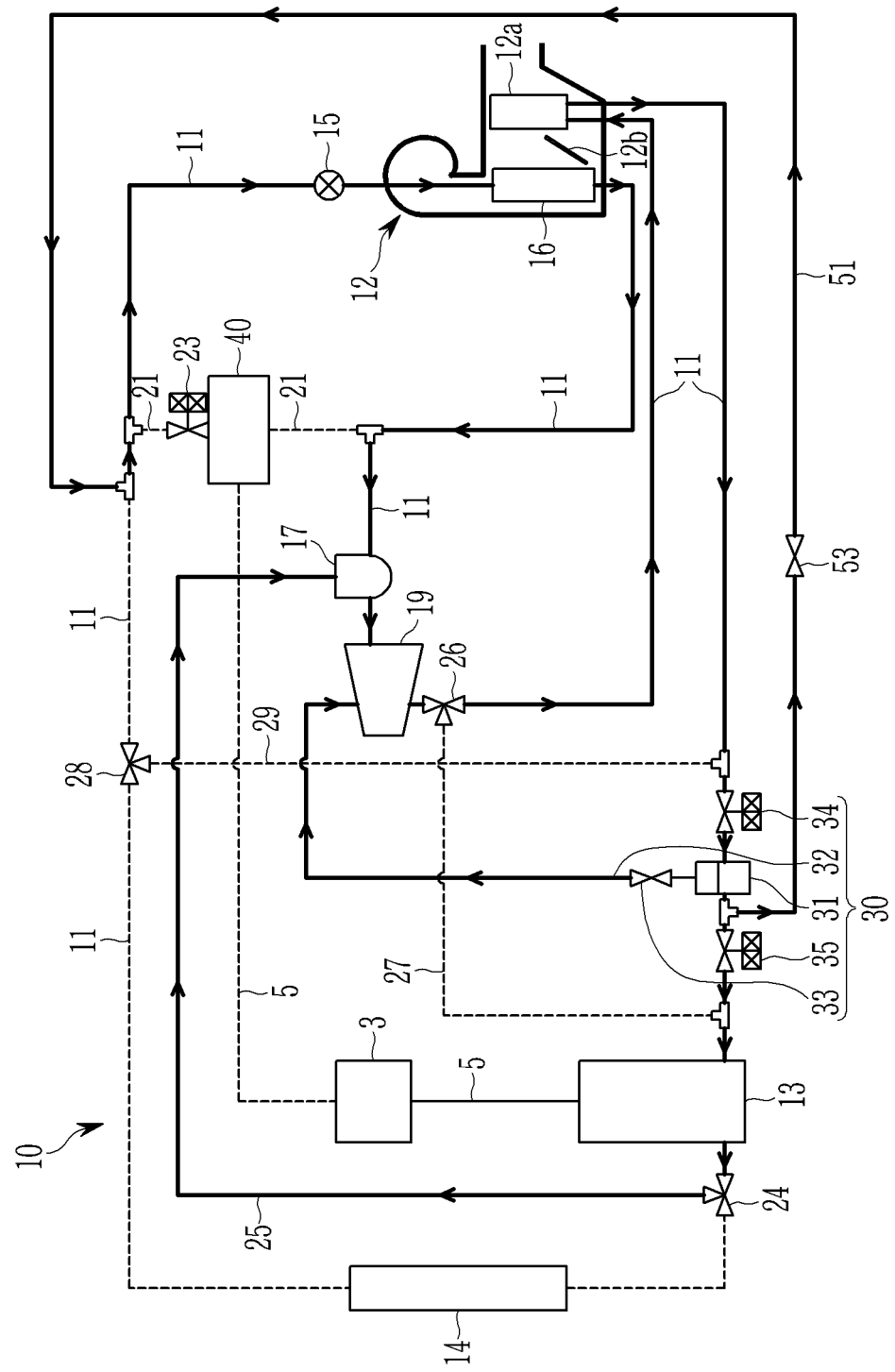
FIG. 8 illustrates an operational state diagram of a dehumidifying mode of a vehicle when the gas injection device is operated in a heat pump system for a vehicle according to various exemplary embodiments of the present invention.

FIG. 8 illustrates an operational state diagram of a dehumidifying mode of a vehicle when the gas injection device is operated in a heat pump system for a vehicle according to various exemplary embodiments of the present invention.

the heat pump system may perform the dehumidifying mode while heating the interior of the vehicle.

First, the coolant circulation apparatus 3 supplies the coolant to the heat-exchanger 13 through the coolant line 5 connected to the heat-exchanger 13. In the instant case, the coolant line 5 connected to the chiller 40 is closed.

In the air conditioner 10, respective constituent elements thereof operate to heat and dehumidify the interior of the vehicle. Accordingly, the refrigerant is circulated along the refrigerant line 11.

Herein, the refrigerant line 11 connecting the sub-condenser 14 and the evaporator 16 is closed through operation of the first expansion valve 15.

The refrigerant connection line 21 is closed through operation of the second expansion valve 23.

At the same time, the first branch line 25 is opened through operation of the first refrigerant valve 24.

The second branch line 27 is closed through operation of the second refrigerant valve 26, and the third branch line 29 is closed through operation of the third refrigerant valve 28.

The fourth branch line 51 is opened through operation of the check valve 53.

Furthermore, the refrigerant line 11 connecting the heat-exchanger 13 and the sub-condenser 14 may be closed through operation of the first refrigerant valve 24.

Herein, when the gas injection device 30 is operated, the supply line 32 is opened through operation of the control valve 33.

In the present state, the third expansion valve 34 expands the refrigerant supplied from the internal condenser 12a to supply it to the gas-liquid separator 31.

Among the refrigerant supplied to the gas-liquid separator 31, the gaseous refrigerant is supplied to the compressor 19 through the opened supply line 32.

That is, the gas injection device 30 flows the gaseous refrigerant heat-exchanged while passing through the gas-liquid separator 31 back into the compressor 19 through the supply line 32, increasing the flow rate of the refrigerant circulating in the refrigerant line 11.

Furthermore, the liquid refrigerant discharged from the gas-liquid separator 31 through the refrigerant line 11 flows into the heat-exchanger 13 along the refrigerant line 11 opened through operation of the fourth expansion valve 35.

The fourth expansion valve 35 expands the refrigerant that has passed the gas-liquid separator 31.

Accordingly, the heat-exchanger 13 may evaporate the refrigerant through heat-exchange with the coolant.

That is, the gas-liquid separator 31 of the gas injection device 30 may bypass the gaseous refrigerant to the compressor 19 through the supply line 32, and may supply the liquid refrigerant to the fourth expansion valve 35.

Accordingly, the refrigerant may be expanded while passing through the fourth expansion valve 35, and may be evaporated through heat-exchange with the coolant in the heat-exchanger 13.

Meanwhile, the fourth branch line 51 supplies some of the refrigerant that have passed through the gas-liquid separator 31 to the first expansion valve 15.

Accordingly, some of the refrigerant introduced into the fourth branch line 51 is expanded while passing through the first expansion valve 15. The expanded refrigerant is introduced into the evaporator 16.

The refrigerant evaporated in the heat-exchanger 13 is supplied to the accumulator 17 along the first branch line 25.

The refrigerant supplied to the accumulator 17 is separated into gas and liquid. The gaseous refrigerant of the refrigerant separated into gas and liquid is supplied to the compressor 19.

The refrigerant compressed at a high temperature and high pressure in the compressor 19 flows into the internal condenser 12a.

Herein, the refrigerant supplied to the internal condenser 12a may increase the temperature of the external air introducing into the HVAC module 12.

The opening and closing door 12b is opened so that the external air that introduces into the HVAC module 12 and then passes through the evaporator 16 passes through the internal condenser 12a.

That is, the external air introducing into the HVAC module 12 is dehumidified while passing through the evaporator 16 by the low-temperature refrigerant introducing into the evaporator 16. Accordingly, while passing through the internal condenser 12a, it is converted into a high temperature state to introduce into the interior of the vehicle, smoothly heating and dehumidifying the interior of the vehicle.

Accordingly, as described above, when the heat pump system for the vehicle according to the exemplary embodiment of the present invention is applied, simplification of the system may be realized, by use of one chiller 40 in which a refrigerant and a coolant are heat-exchanged to control a temperature of a battery module according to a vehicle mode.

Furthermore, according to the exemplary embodiment of the present invention, by efficiently controlling a temperature of a battery module, it is possible to operate the battery module at optimal performance, and a total mileage of the vehicle may be increased through efficient management of the battery module.

Furthermore, according to the exemplary embodiment of the present invention, it is possible to maximize cooling and heating performance by selectively increasing a flow rate of refrigerant in the cooling, heating, or dehumidifying mode of the vehicle by applying the gas injection device 30.

Furthermore, the present invention may reduce the manufacturing cost and weight through simplification of the entire system, and may improve space utilization.

While the present invention has been described in connection with what is presently considered to be practical exemplary embodiments of the present invention, it is to be understood that the present invention is not limited to the included exemplary embodiments. On the other hand, it is directed to cover various modifications and equivalent claims as well as various alternatives and modifications thereof. It is intended that the scope of the present invention be defined by the Claims appended hereto and their equivalents."

In various exemplary embodiments of the present invention, a controller is connected to at least one of the elements of the heat pump system such as the control valve 33 but not limited thereto, to control the operations thereof.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A heat pump system for a vehicle, the heat pump system comprising:
    an air conditioner circulating a refrigerant through a refrigerant line;
    a coolant circulation apparatus circulating a coolant through a coolant line;
    a chiller which is connected to the coolant circulation apparatus through the coolant line, is connected to the refrigerant line through a refrigerant connection line connected to a portion of the refrigerant line, and heat-exchanges a coolant selectively introduced from the coolant circulation apparatus with a refrigerant supplied from the air conditioner to control a temperature of the selectively introduced coolant; and
    a gas injection device provided in the air conditioner and increasing a flow rate of the refrigerant circulating in the refrigerant line by bypassing a part of a refrigerant passing through an internal condenser connected to the refrigerant line to a compressor,
    wherein a heat-exchanger provided in the air conditioner is connected to the coolant circulation apparatus through the coolant line so that the coolant is supplied from the coolant circulation apparatus, and wherein the heat pump system further includes a first branch line connected to the refrigerant line through a first refrigerant valve connected to the refrigerant line at a rear end portion of the heat-exchanger, based on a flow direction of the refrigerant.

2. The heat pump system for the vehicle of claim 1, wherein the air conditioner includes:
a heating, ventilation, and air conditioning (HVAC) module including an evaporator connected to the refrigerant line, and a door that is configured to selectively flow an external air passing through the evaporator into the internal condenser according to cooling, heating, and dehumidifying modes of the vehicle;
the heat-exchanger that is connected to the refrigerant line and the coolant line and heat-exchanges a refrigerant supplied through the refrigerant line with a coolant supplied through the coolant line from the coolant circulation apparatus;
the compressor connected between the evaporator and the heat-exchanger through the refrigerant line;
a sub-condenser provided in the refrigerant line between the heat-exchanger and the evaporator;
a first expansion valve provided in the refrigerant line connecting the sub-condenser and the evaporator;
a second expansion valve provided in the refrigerant connection line; and
an accumulator provided in the refrigerant line between the evaporator and the compressor.

3. The heat pump system for the vehicle of claim 2, wherein the second expansion valve selectively expands a refrigerant that has passed through the sub-condenser according to a mode of the vehicle among the cooling, heating, and dehumidifying modes of the vehicle, to introduce the refrigerant into the refrigerant connection line.

4. The heat pump system for the vehicle of claim 2, wherein a first end portion of the refrigerant connection line is connected to the refrigerant line between the sub-condenser and the first expansion valve,
wherein a second end portion of the refrigerant connection line is connected to the refrigerant line between the accumulator and the evaporator,
wherein a first end portion of the first branch line is connected to the refrigerant line between the heat-exchanger and the sub-condenser through the first refrigerant valve, and
wherein a second end portion of the first branch line is connected to the accumulator.

5. The heat pump system for the vehicle of claim 4, wherein the gas injection device includes:
a gas-liquid separator provided in the refrigerant line between the internal condenser and the heat exchanger, and separating and selectively discharging a gaseous refrigerant and a liquid refrigerant among the refrigerant that have passed through the internal condenser;
a supply line connecting the gas-liquid separator and the compressor, and selectively supplying the gaseous refrigerant from the gas-liquid separator to the compressor;
a control valve provided in the supply line;
a third expansion valve provided in the refrigerant line between the internal condenser and the gas-liquid separator; and
a fourth expansion valve provided in the refrigerant line between the gas-liquid separator and the heat-exchanger.

6. The heat pump system for the vehicle of claim 5, further including:
a second branch line having a first end portion connected to a second refrigerant valve provided in the refrigerant line between the internal condenser and the compressor, and a second end portion connected to the refrigerant line between the fourth expansion valve and the heat-exchanger;
a third branch line having a first end portion connected to a third refrigerant valve provided in the refrigerant line between the sub-condenser and the first expansion valve, and a second end portion connected to the refrigerant line between the internal condenser and the third expansion valve; and
a fourth branch line having a first end portion connected to the refrigerant line between the gas-liquid separator and the fourth expansion valve and a second end portion connected to the refrigerant line between the third refrigerant valve and the first expansion valve, and having a check valve in the fourth branch line.

7. The heat pump system for the vehicle of claim 6, wherein
when a battery module is cooled in the cooling mode of the vehicle and the gas injection device is operated,
the coolant circulation apparatus supplies a coolant to the heat-exchanger and the chiller through the coolant line connected to the heat-exchanger and the chiller;
in the air conditioner,
the refrigerant connection line is opened through operation of the second expansion valve;
the refrigerant line connected to the first expansion valve is closed through operation of the third refrigerant valve;
the refrigerant line connecting the internal condenser and the compressor is closed through operation of the second refrigerant valve;
the refrigerant is circulated along the opened refrigerant line and the refrigerant connection line;
the first and second expansion valves expand a refrigerant so that an expanded refrigerant is supplied to the evaporator and the chiller, respectively;
the first branch line is closed;
the second, third, and fourth branch lines are opened;
the refrigerant line connecting the heat-exchanger and the sub-condenser is opened through operation of the first refrigerant valve;
the heat-exchanger condenses the refrigerant through heat-exchange with the coolant;
the sub-condenser further condenses the refrigerant through heat-exchange with external air;
in the gas injection device, the supply line is opened;
the third expansion valve expands the refrigerant supplied through the third branch line and supplies it to the gas-liquid separator; and
the fourth expansion valve is not operated.

8. The heat pump system for the vehicle of claim 6, wherein
when a battery module is cooled in the cooling mode of the vehicle and the gas injection device is not operated,
the coolant circulation apparatus supplies a coolant to the heat-exchanger and the chiller through the coolant line connected to the heat-exchanger and the chiller;
in the air conditioner,
the refrigerant connection line is opened through operation of the second expansion valve;
the refrigerant is circulated along the refrigerant line and the refrigerant connection line;

the first and second expansion valves expand a refrigerant so that an expanded refrigerant is supplied to the evaporator and the chiller, respectively;
the first, second, third, and fourth branch lines are closed;
the refrigerant line connecting the heat-exchanger and the sub-condenser is opened through operation of the first refrigerant valve;
the heat-exchanger condenses the refrigerant through heat-exchange with the coolant; and
the sub-condenser further condenses the refrigerant through heat-exchange with external air;
in the gas injection device, the supply line is closed; and
the third and fourth expansion valves introduce the refrigerant supplied from the internal condenser into the refrigerant line without expanding.

9. The heat pump system for the vehicle of claim 6, wherein
when the gas injection device is operated in the heating mode of the vehicle, the supply line is opened;
the third expansion valve expands a refrigerant supplied from the internal condenser to supply the refrigerant to the gas-liquid separator;
the fourth expansion valve expands a refrigerant supplied from the gas-liquid separator to supply the refrigerant to the heat-exchanger;
the first branch line is opened through operation of the first refrigerant valve; and
the second, third, and fourth branch lines are closed.

10. The heat pump system for the vehicle of claim 6, wherein
when the gas injection device is not operated in the heating mode of the vehicle, the supply line is closed;
the third expansion valve passes a refrigerant supplied from the internal condenser;
the fourth expansion valve expands a refrigerant that has passed through the gas-liquid separator to supply the refrigerant to the heat-exchanger;
the first branch line is opened through operation of the first refrigerant valve; and
the second, third, and fourth branch lines are closed.

11. The heat pump system for the vehicle of claim 6, wherein
when the gas injection device is not operated in the dehumidifying mode of the vehicle, the supply line is closed;
the third expansion valve passes a refrigerant supplied from the internal condenser; and
the fourth expansion valve expands a refrigerant that has passed through the gas-liquid separator to supply the refrigerant to the heat-exchanger;
the first branch line is opened through operation of the first refrigerant valve;
the second and third branch lines are closed; and
the fourth branch line is opened.

12. The heat pump system for the vehicle of claim 6, wherein
when the gas injection portion is operated in the dehumidifying mode of the vehicle, the supply line is opened;
the third expansion valve expands a refrigerant supplied from the internal condenser to supply the refrigerant to the gas-liquid separator;
the fourth expansion valve expands a refrigerant that has passed through the gas-liquid separator to supply the refrigerant to the heat-exchanger;

the first branch line is opened through operation of the first refrigerant valve;
the second and third branch lines are closed; and
the fourth branch line is opened.

13. The heat pump system for the vehicle of claim 5, wherein the control valve, when the gas injection device is operated, operates so that the supply line is opened.

14. The heat pump system for the vehicle of claim 5, wherein the second, third, and fourth expansion valves are electronic expansion valves that selectively expand a refrigerant while controlling flowing of the refrigerant.

15. The heat pump system for the vehicle of claim 5, wherein the heat-exchanger additionally condenses or evaporates the refrigerant discharged from the gas-liquid separator through heat-exchange with the coolant, according to a selective operation of the fourth expansion valve.

16. The heat pump system for the vehicle of claim 6, wherein
in the heating mode of the vehicle,
the coolant circulation apparatus supplies a coolant to the heat-exchanger through the coolant line connected to the heat-exchanger;
in the air conditioner, the refrigerant line connecting the sub-condenser and the evaporator is closed through operation of the first expansion valve;
the refrigerant connection line is closed through operation of the second expansion valve;
the fourth expansion valve expands the refrigerant;
the first branch line is opened through operation of the first refrigerant valve;
the refrigerant line connecting the heat-exchanger and the sub-condenser is closed through operation of the first refrigerant valve;
the heat-exchanger evaporates the refrigerant through heat-exchange with the coolant; and
the gas injection device is selectively operated.

17. The heat pump system for the vehicle of claim 6, wherein
in the dehumidifying mode of the vehicle,
the coolant circulation apparatus supplies a coolant to the heat-exchanger through the coolant line connected to the heat-exchanger;
in the air conditioner, the refrigerant line connecting the sub-condenser and the evaporator is closed through operation of the first expansion valve;
the refrigerant connection line is closed through operation of the second expansion valve;
the first branch line is opened through operation of the first refrigerant valve;
the refrigerant line connecting the heat-exchanger and the sub-condenser is closed through operation of the first refrigerant valve;
the heat-exchanger evaporates the refrigerant through heat-exchange with the coolant;
the fourth branch line is opened through operation of the check valve; and
the gas injection device is selectively operated.

18. The heat pump system for the vehicle of claim 2, wherein the gas injection device includes:
a plate-shaped heat-exchanger provided in the refrigerant line between the heat-exchanger and the sub-condenser;
a supply line that includes a first end portion connected to the refrigerant line between the heat-exchanger and the plate-shaped heat-exchanger and a second end portion connected to the compressor through the plate-shaped heat-exchanger;

a third expansion valve provided in the supply line at a front end portion of the plate-shaped heat-exchanger; and a fourth expansion valve provided in the refrigerant line between the plate-shaped heat-exchanger and the sub-condenser.

19. The heat pump system for the vehicle of claim 2, wherein the heat-exchanger is a water-cooled heat-exchanger, and wherein the sub-condenser is an air-cooled heat-exchanger.

20. The heat pump system for the vehicle of claim 1, wherein the gas injection device selectively operates in a cooling, heating, or dehumidifying mode of the vehicle.

* * * * *